United States Patent
Sano (10) Patent No.: US 12,427,945 B1
(45) Date of Patent: Sep. 30, 2025

(54) VEHICLE SEAT AND ASSEMBLING METHOD OF VEHICLE SEAT

(71) Applicant: Honda Motor Co., Ltd., Tokyo (JP)

(72) Inventor: Koji Sano, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 18/961,462

(22) Filed: Nov. 27, 2024

(30) Foreign Application Priority Data

Mar. 19, 2024 (CN) .......................... 202410312428.3

(51) Int. Cl.
*B60R 21/2165* (2011.01)
*B60N 2/58* (2006.01)
*B60R 21/207* (2006.01)

(52) U.S. Cl.
CPC ........ *B60R 21/2165* (2013.01); *B60N 2/5825* (2013.01); *B60R 21/207* (2013.01); *B60N 2002/5808* (2013.01)

(58) Field of Classification Search
CPC .. B60R 21/207; B60R 21/2165; B60N 2/5825
See application file for complete search history.

(56) References Cited

U.S. PATENT DOCUMENTS

| | | | |
|---|---|---|---|
| 5,967,603 A * | 10/1999 | Genders | B60R 21/207 |
| | | | 280/730.2 |
| 9,751,488 B1 * | 9/2017 | Saito | B60R 21/207 |
| 9,914,422 B2 * | 3/2018 | Yoo | B60R 21/207 |
| 10,252,690 B2 * | 4/2019 | Seo | B60R 21/2165 |
| 11,548,463 B2 * | 1/2023 | Natsume | B60R 21/207 |
| 12,109,965 B2 * | 10/2024 | Suzuki | B60R 21/207 |
| 12,122,277 B2 * | 10/2024 | Akutsu | B60N 2/646 |
| 2024/0391370 A1 * | 11/2024 | Fouinat | B60N 2/64 |

FOREIGN PATENT DOCUMENTS

| | | |
|---|---|---|
| JP | 2008037261 | 2/2008 |
| JP | 2018131064 | 8/2018 |

\* cited by examiner

*Primary Examiner* — Faye M Fleming
(74) *Attorney, Agent, or Firm* — JCIPRNET (57) ABSTRACT

A vehicle seat and an assembling method of the vehicle seat are provided. The vehicle seat includes: a seat frame, having a side frame; an airbag module, fixed onto the side frame; a liner, covering the seat frame; a covering, covering the seat frame and the liner, the covering being provided with a tearing portion that is ruptured when an airbag is expanded; a first lining cloth, wherein an outer end of the first lining cloth is connected to the tearing portion; a second lining cloth, wherein an outer end of the second lining cloth is connected to the tearing portion; and a first hook portion, disposed at an inner end of one of the first lining cloth and the second lining cloth, and configured to hook and fix one of the first lining cloth and the second lining cloth onto the side frame.

14 Claims, 9 Drawing Sheets

VEHICLE SEAT AND ASSEMBLING METHOD OF VEHICLE SEAT

CROSS-REFERENCE TO RELATED APPLICATION

This application claims the priority benefit of China application serial no. 202410312428.3, filed on Mar. 19, 2024. The entirety of the above-mentioned patent application is hereby incorporated by reference herein and made a part of this specification.

BACKGROUND

Technical Field

The disclosure relates to a vehicle seat and an assembling method of the vehicle seat.

Description of Related Art

In recent years, efforts have been actively made to provide access to sustainable transportation systems that also take into account disadvantaged people such as the elderly, the disabled, or children among traffic participants. In order to implement the above objective, research and development efforts are being made to further improve traffic safety or convenience through developments related to collision safety performance. In the prior art, various relevant structures have been developed for vehicle seats provided with airbag devices for protecting passengers during collisions.

For example, Patent Literature 1 (Japanese Patent Publication No. 2008-037261) discloses a vehicle seat, which is installed in a vehicle and provided with a side airbag module for protecting a passenger from the side. The side airbag module includes an inflator which is a gas generator, an airbag that is expanded by gas from the inflator, and an airbag housing that accommodates the airbag and the inflator. The side airbag module is embedded in a door-side side pad of a seat backrest. A covering covering the door-side side pads on two sides of the seat backrest is composed of a front portion and a side portion, and a tearing portion is disposed at a junction of the front portion and the side portion of the covering. When a collision occurs, the side airbag module is supplied with gas from the inflator to inflate the airbag. When an inflation pressure of the airbag reaches a predetermined value, the tearing portion is ruptured to expand the airbag toward the front side of the vehicle. In Patent Literature 1, a front inner side and a side inner side of the covering of the vehicle seat are respectively provided with a first lining cloth and a second lining cloth that are difficult to stretch, so that the process of tearing the tearing portion through the first lining cloth and the second lining cloth is divided into two stages to ensure that the tearing portion is ruptured. However, the first lining cloth and the second lining cloth that are difficult to stretch in Patent Literature 1 need to be fixed onto a side frame through a supporting component provided with bolts. Therefore, positions of fixing holes for fixing the first lining cloth and the second lining cloth disposed in the supporting member need to be adjusted in consideration of the configuration layout of a side portion of the vehicle seat, which increases difficulty in assembly. Therefore, there is still room for improvement in how to balance both the reliability of the vehicle seat and the ease of the assembling process.

The disclosure aims to improve the collision safety performance, thereby helping to develop a sustainable transportation system.

SUMMARY

The disclosure provides a vehicle seat. The vehicle seat includes: a seat frame, having a side frame; an airbag module, fixed onto the side frame; a liner, covering the seat frame; a covering, covering the seat frame and the liner, the covering being provided with a tearing portion that is ruptured when an airbag is expanded; a first lining cloth, wherein an outer end of the first lining cloth is connected to the tearing portion; a second lining cloth, wherein an outer end of the second lining cloth is connected to the tearing portion; and a first hook portion, disposed at an inner end of one of the first lining cloth and the second lining cloth, and configured to hook and fix one of the first lining cloth and the second lining cloth onto the side frame.

DESCRIPTION OF THE EMBODIMENTS

The disclosure provides a vehicle seat and an assembling method of the vehicle seat, which have good reliability and simple assembling process.

The disclosure provides a vehicle seat. The vehicle seat includes: a seat frame, having a side frame; an airbag module, fixed onto the side frame; a liner, covering the seat frame; a covering, covering the seat frame and the liner, the covering being provided with a tearing portion that is ruptured when an airbag is expanded; a first lining cloth, wherein an outer end of the first lining cloth is connected to the tearing portion; a second lining cloth, wherein an outer end of the second lining cloth is connected to the tearing portion; and a first hook portion, disposed at an inner end of one of the first lining cloth and the second lining cloth, and configured to hook and fix one of the first lining cloth and the second lining cloth onto the side frame.

In an embodiment of the disclosure, the vehicle seat further includes: a connecting portion, disposed at the inner end of the first lining cloth and the inner end of the second lining cloth, and configured to connect the inner end of the first lining cloth and the inner end of the second lining cloth.

In an embodiment of the disclosure, the connecting portion is a fastener extending along the side frame.

In an embodiment of the disclosure, the connecting portion is a second hook portion, and the second hook portion hooks and fixes the inner end of one of the first lining cloth and the second lining cloth onto the inner end of other one of the first lining cloth and the second lining cloth.

In an embodiment of the disclosure, the inner end of the first lining cloth is directly connected to the inner end of the second lining cloth.

In an embodiment of the disclosure, the vehicle seat is installed in a manner such that the first lining cloth and the second lining cloth surround the airbag module and the side frame.

The disclosure provides an assembling method of a vehicle seat. The vehicle seat includes a seat frame having a side frame, an airbag module fixed onto the side frame, a liner covering the seat frame, a covering covering the seat frame and the liner, and a first lining cloth and a second lining cloth, wherein the covering is provided with a tearing portion that is ruptured when an airbag is expanded, and an outer end of the first lining cloth and an outer end of the second lining cloth are both connected to the tearing portion. The assembling method of the vehicle seat includes: a fixing step of hooking and fixing a hook portion disposed at an inner end of one of the first lining cloth and the second lining cloth onto the side frame; and a connecting step of connecting the inner end of the first lining cloth and the inner end of the second lining cloth.

In an embodiment of the disclosure, in the connecting step, the inner end of the first lining cloth and the inner end of the second lining cloth are connected through a connecting portion respectively disposed at the inner ends of the first lining cloth and the second lining cloth.

In an embodiment of the disclosure, in the connecting step, the inner end of the first lining cloth is directly connected to the inner end of the second lining cloth.

In an embodiment of the disclosure, before the fixing step, the airbag module is installed to the side frame.

Based on the above, in the embodiments of the disclosure, the vehicle seat can limit the expansion direction of the inflatable airbag during a collision through the configurations of the first lining cloth and the second lining cloth, and a load of an inflation pressure of the airbag may be easily concentrated on the tearing portion, thereby making it easier to rupture the tearing portion and enable the airbag to be smoothly expanded toward a front side of a vehicle. Furthermore, in the embodiments of the disclosure, since the airbag module of the vehicle seat may be assembled to the side frame first, and through the configuration of the first hook portion, the steps of fixing the first lining cloth and the second lining cloth onto the side frame may be simplified, thereby facilitating the overall assembling process of the vehicle seat.

In order for the features and advantages of the disclosure to be more comprehensible, the following specific embodiments are described in detail in conjunction with the drawings.

Figure 1:
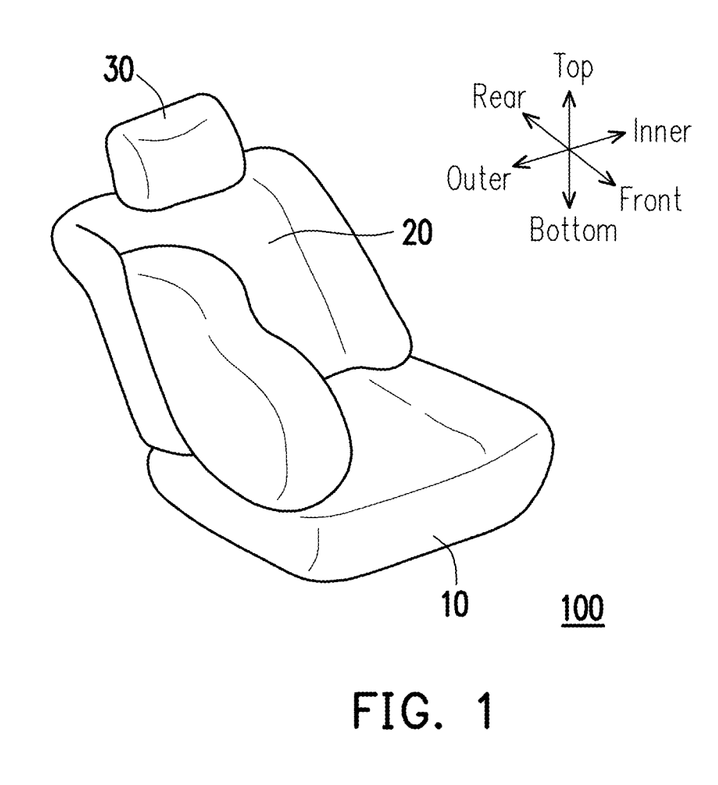
FIG. 1 is a schematic diagram of an appearance of a vehicle seat according to an embodiment of the disclosure.
Figure 2A:
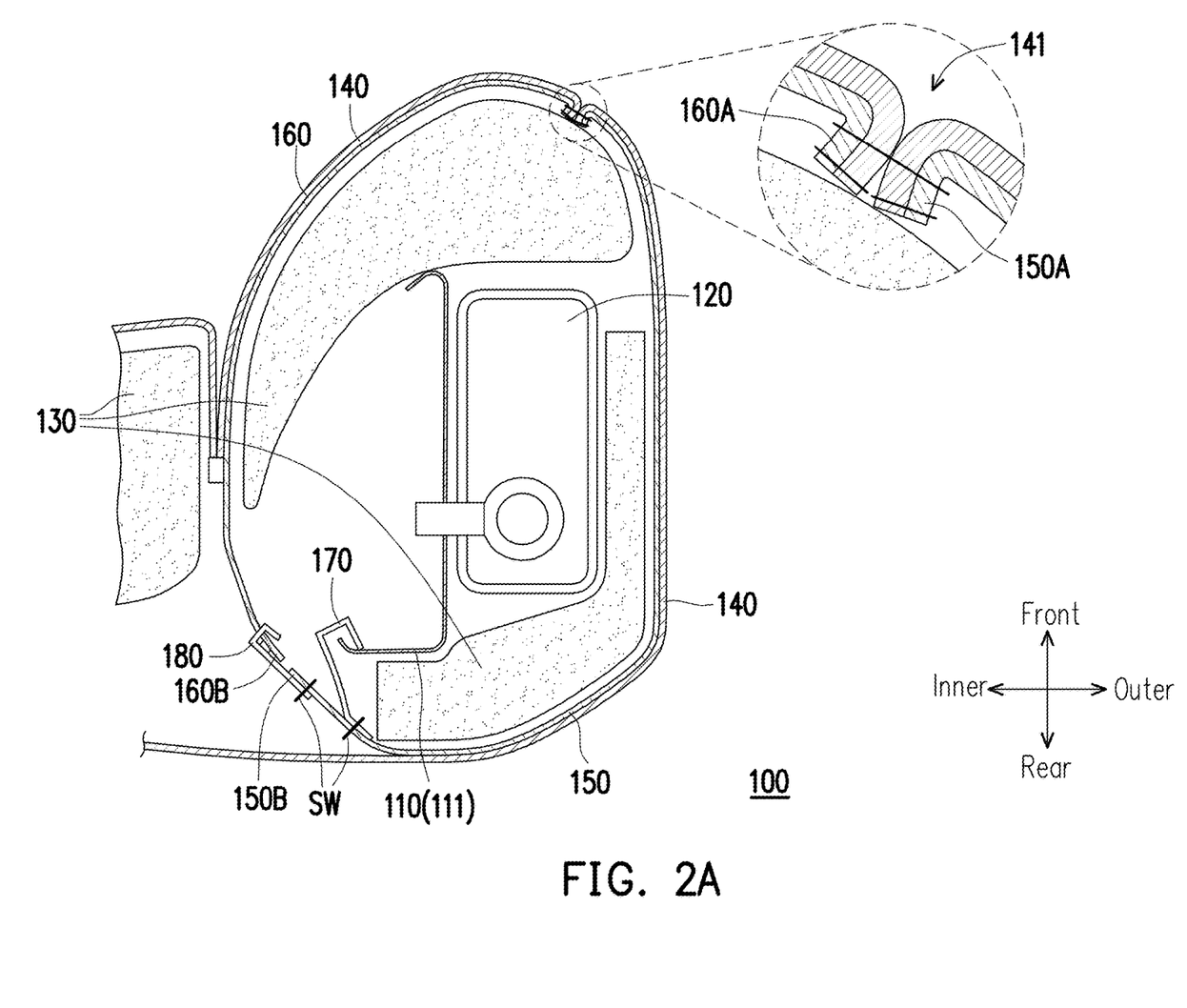
FIG. 2A is a schematic cross-sectional diagram of the vehicle seat shown in FIG. 1 near an airbag module.
Figure 2B:
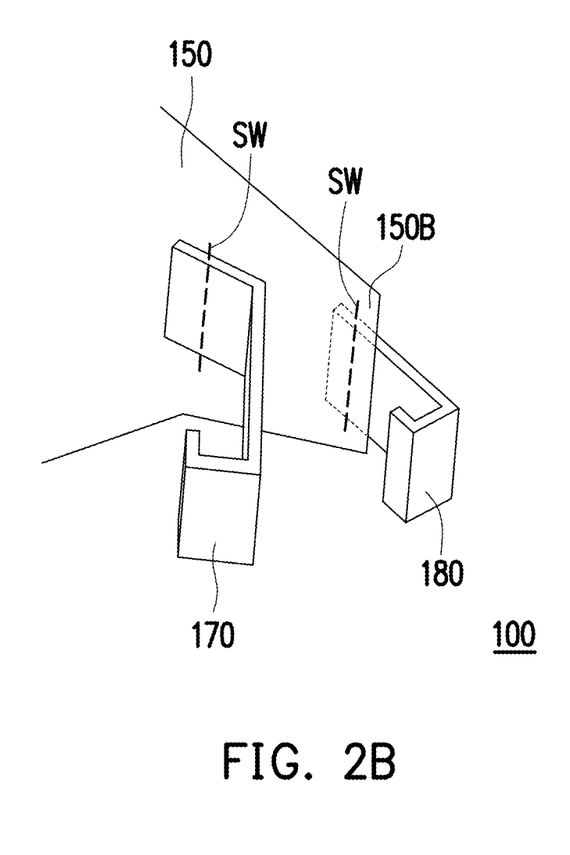
FIG. 2B is a schematic structural diagram of a first hook portion and a connecting portion of the vehicle seat shown in FIG. 2A.

FIG. 1 is a schematic diagram of an appearance of a vehicle seat according to an embodiment of the disclosure. FIG. 2A is a schematic cross-sectional diagram of the vehicle seat shown in FIG. 1 near an airbag module. FIG. 2B is a schematic structural diagram of a first hook portion and a connecting portion of the vehicle seat shown in FIG. 2A. It should be noted that for the sake of convenience, the front-rear direction, the inner-outer direction, and the top-bottom direction of the vehicle seat are defined as shown in the drawings, and the formation of each part is explained according to the definition. The front-rear direction, the inner-outer direction, and the top-bottom direction of the vehicle seat are respectively equivalent to the vehicle length direction, the vehicle width direction, and the vehicle height direction.

Please refer to FIG. 1. In the embodiment, a vehicle seat 100 includes a cushion 10, a seat backrest 20 connected to a rear end portion of the cushion 10 in a tiltable manner, and a headrest 30 connected to an upper end portion of the seat backrest 20. For example, the vehicle seat 100 is a driver seat of a left-hand drive vehicle or a passenger seat of a right-hand drive vehicle. As shown in FIG. 1, in the embodiment, the vehicle seat 100 is disposed on the right side in a vehicle compartment. In the case where the vehicle seat is disposed on the left side in the vehicle compartment, the vehicle seat has a left-right symmetrical configuration with the vehicle seat 100 in the embodiment.

Further, as shown in FIG. 1 to FIG. 2B, in the vehicle seat 100 of the embodiment, the vehicle seat 100 also includes a seat frame 110 having a side frame 111, an airbag module 120 fixed onto the side frame 111, a liner 130 covering the seat frame 110, a covering 140 covering the seat frame 110 and the liner 130, a first lining cloth 150 located on an outer side in the vehicle width direction, a second lining cloth 160 located on an inner side in the vehicle width direction, a first hook portion 170, and a connecting portion. The side frame 111 is provided as a left and right pair, upper ends of the side frame 111 are connected to each other through an upper frame, and lower ends of the side frame 111 are connected to each other through a lower frame, and the side frame 111 has a substantially rectangular shape.

Specifically, as shown in FIG. 1 and FIG. 2A, in the embodiment, the airbag module 120 is installed to the side frame 111 on the outer side of the seat frame 110 in the vehicle width direction in the seat backrest 20. Furthermore, in the embodiment, an assembling method of the vehicle seat 100 may first install the airbag module 120 to the side frame 111, and then perform a fixing step of fixing the first lining cloth 150 and the second lining cloth 160 by hooking and fixing one of the first lining cloth 150 and the second lining cloth 160 onto the side frame 111 using the first hook portion 170 disposed at the inner end of one of the first lining cloth 150 and the second lining cloth 160, and a connecting step of connecting the first lining cloth 150 and the second lining cloth 160. For example, in the embodiment, the first hook portion 170 is disposed on the first lining cloth 150, and the first lining cloth 150 is hooked and fixed onto the side frame 111, but the disclosure is not limited thereto. In another embodiment, the first hook portion 170 may also be disposed on the second lining cloth 160, and the second lining cloth 160 is hooked and fixed onto the side frame 111. For example, the first hook portion 170 is disposed on the first lining cloth 150 in a manner of being fixed by stitches SW. Furthermore, the fixing step may be performed after the connecting step or the fixing step and the connecting step may be simultaneously performed.

On the other hand, in the connecting step of the embodiment, an inner end 150B of the first lining cloth 150 and an inner end 160B of the second lining cloth 160 may be connected through a connecting portion respectively disposed at the inner end 150B of the first lining cloth 150 and the inner end 160B of the second lining cloth 160. For example, in the embodiment, the connecting portion is a second hook portion 180, and the second hook portion 180 hooks the inner end 160B of the second lining cloth 160 and is fixed onto the inner end 150B of the first lining cloth 150.

For example, the second hook portion 180 is disposed at the inner end 150B of the first lining cloth 150 also in a manner of being fixed by stitches SW. As such, as shown in FIG. 2A, in the embodiment, the vehicle seat 100 may be installed in a manner such that the first lining cloth 150 and the second lining cloth 160 surround the airbag module 120 and the side frame 111.

Moreover, as shown in FIG. 2A, the covering 140 is provided with a tearing portion 141 that is ruptured when an airbag is expanded, and an outer end 150A of the first lining cloth 150 and an outer end 160A of the second lining cloth 160 are both connected to the tearing portion 141. Furthermore, in the embodiment, the first lining cloth 150 and the second lining cloth 160 have the property of being difficult to stretch to be configured to limit an expansion direction of the airbag. In this way, when a collision occurs, when the airbag module 120 supplies gas from an inflator disposed inside to inflate and pressurize the airbag disposed therein, the expansion direction of the airbag is limited to expand toward the front side through the configurations of the first lining cloth 150 and the second lining cloth 160, and a load of an expansion pressure of the airbag may be easily concentrated on the tearing portion 141, thereby making it easier to rupture the tearing portion 141 and enable the airbag to be smoothly expanded toward a front side of a vehicle. Furthermore, in the embodiment of the disclosure, since the airbag module 120 may be assembled to the side frame 111 first, and through the configuration of the first hook portion 170, the step of fixing the first lining cloth 150 and the second lining cloth 160 onto the side frame 111 may be simplified, thereby facilitating the overall assembling process of the vehicle seat 100.

In the embodiment, although the first hook portion 170 and the second hook portion 180 are exemplified as being simultaneously disposed on the first lining cloth 150, the disclosure is not limited thereto. In other embodiments, the first hook portion 170 and the second hook portion 180 may also be simultaneously disposed on the second lining cloth 160 or the first hook portion 170 may be disposed on one of the first lining cloth 150 and the second lining cloth 160 and the second hook portion 180 may be disposed on the other one of the first lining cloth 150 and the second lining cloth 160. At this time, the second hook portion 180 hooks the inner end of one of the first lining cloth 150 and the second lining cloth 160 and is fixed onto the inner end of the other one of the first lining cloth 150 and the second lining cloth 160.

In addition, it is worth noting that in the above embodiment, although the connecting portion is exemplified by the second hook portion 180, the disclosure is not limited thereto. In other embodiments, the connecting portion may be other components or there may be no connecting portion and the inner end 150B of the first lining cloth 150 is directly connected to the inner end 160B of the second lining cloth 160, as long as the inner end 150B of the first lining cloth 150 and the inner end 160B of the second lining cloth 160 may be connected to each other. The following will provide further explanation in conjunction with FIG. 3A to FIG. 6.

Figure 3A:
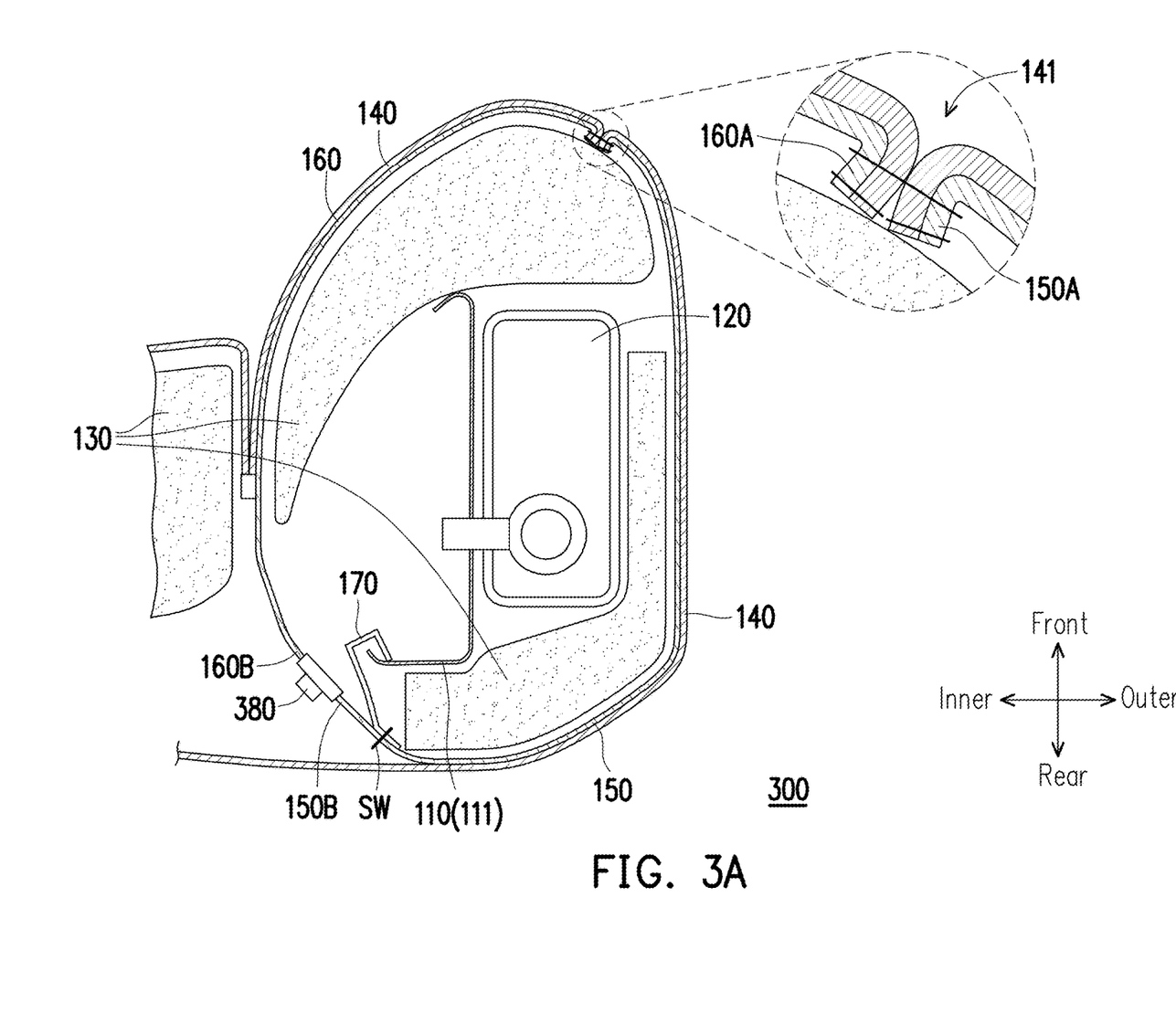
FIG. 3A is a schematic cross-sectional diagram of a vehicle seat according to another embodiment of the disclosure near an airbag module.
Figure 3B:
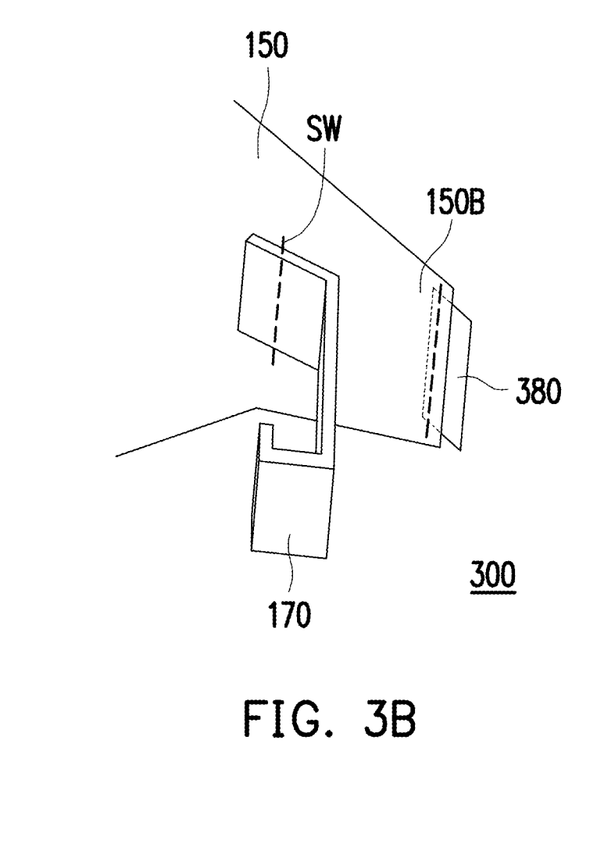
FIG. 3B is a schematic structural diagram of a first hook portion and a connecting portion of the vehicle seat shown in FIG. 3A.

FIG. 3A is a schematic cross-sectional diagram of a vehicle seat according to another embodiment of the disclosure near an airbag module, and FIG. 3B is a schematic structural diagram of a first hook portion and a connecting portion of the vehicle seat shown in FIG. 3A. Please refer to FIG. 3A and FIG. 3B. In the embodiment, a vehicle seat 300 is similar to the vehicle seat 100 of FIG. 2A, and the difference between the two is as follows. In the embodiment, a connecting portion of the vehicle seat 300 is a fastener 380 extending along the side frame 111. For example, the fastener 380 may be a zipper or a buckle, and two ends of the fastener 380 are respectively disposed at the inner end 150B of the first lining cloth 150 and the inner end 160B of the second lining cloth 160, so that the inner end 150B of the first lining cloth 150 and the inner end 160B of the second lining cloth 160 are connected through the fastener 380.

In this way, the vehicle seat 300 may also limit an expansion direction of an inflatable airbag during a collision through the configurations of the first lining cloth 150 and the second lining cloth 160, and a load of an inflation pressure of the airbag may also be easily concentrated on the tearing portion 141, thereby making it easier for the tearing portion 141 to rupture. Furthermore, in the embodiment, the airbag module 120 may also be assembled to the side frame 111 first, and through the configuration of the first hook portion 170, the steps of fixing the first lining cloth 150 and the second lining cloth 160 onto the side frame 111 may also be simplified, thereby facilitating the overall assembling process of the vehicle seat 300. Therefore, the vehicle seat 300 can also achieve similar effects and advantages as the vehicle seat 100, which will not be described in detail herein.

Figure 4A:
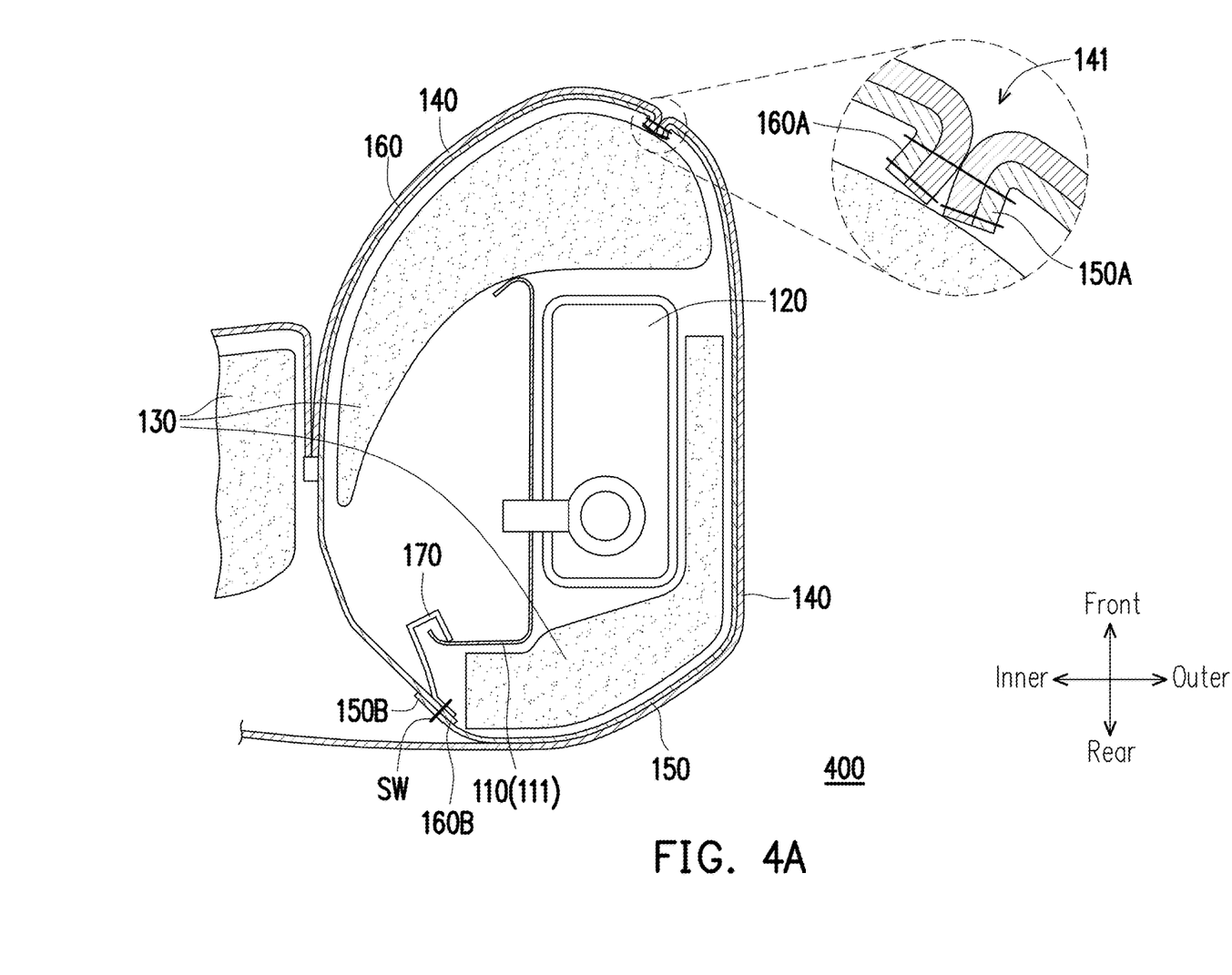
FIG. 4A is a schematic cross-sectional diagram of a vehicle seat according to another embodiment of the disclosure near an airbag module.
Figure 4B:
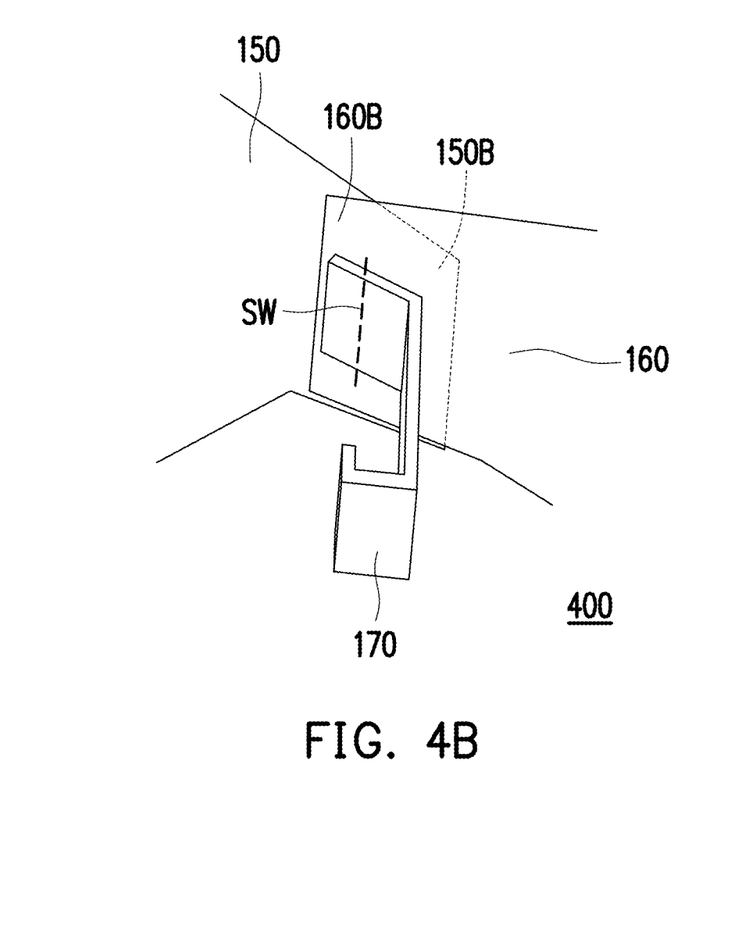
FIG. 4B is a schematic structural diagram of a first hook portion of the vehicle seat shown in FIG. 4A.

FIG. 4A is a schematic cross-sectional diagram of a vehicle seat according to another embodiment of the disclosure near an airbag module, and FIG. 4B is a schematic structural diagram of a first hook portion of the vehicle seat shown in FIG. 4A. Please refer to FIG. 4A and FIG. 4B. In the embodiment, in a vehicle seat 400 of the embodiment, the first hook portion 170 is disposed on the second lining cloth 160, and in a connecting step of an assembling method of the vehicle seat 400 of the embodiment, the inner end 150B of the first lining cloth 150 is directly connected to the inner end 160B of the second lining cloth 160 through an adhesive, a button (not shown), etc. Moreover, in a fixing step, the first hook portion 170 is hooked onto the side frame 111 to fix the first lining cloth 150 and the second lining cloth 160 onto the side frame 111. In addition, the connecting step may also be performed after the fixing step.

In this way, the vehicle seat 400 may also limit an expansion direction of an inflatable airbag during a collision through the configurations of the first lining cloth 150 and the second lining cloth 160, and a load of an inflation pressure of the airbag may also be easily concentrated on the tearing portion 141, thereby making it easier for the tearing portion 141 to rupture. Furthermore, in the embodiment, the airbag module 120 may also be assembled onto the side frame 111 first, and through the configuration of the first hook portion 170, the steps of fixing the first lining cloth 150 and the second lining cloth 160 onto the side frame 111 may also be simplified, thereby facilitating the overall assembling process of the vehicle seat 400. Therefore, the vehicle seat 400 can also achieve similar effects and advantages as the vehicle seat 100, which will not be described in detail herein.

In the above embodiments, although the second lining cloth 160 is exemplified as being disposed between the covering 140 and the liner 130 in the vehicle seat 100, 300, or 400, the disclosure is not limited thereto. In other embodiments, the second lining cloth 160 may also be disposed at other positions in the vehicle seat 100, 300, or 400, as long as the outer end 150A of the first lining cloth 150 and the outer end 160A of the second lining cloth 160 are both connected to the tearing portion 141, and the inner end 150B of the first lining cloth 150 and the inner end 160B of the second lining cloth 160 are connected to each other. The following will provide further explanation in conjunction with FIG. 5 and FIG. 6.

Figure 5:
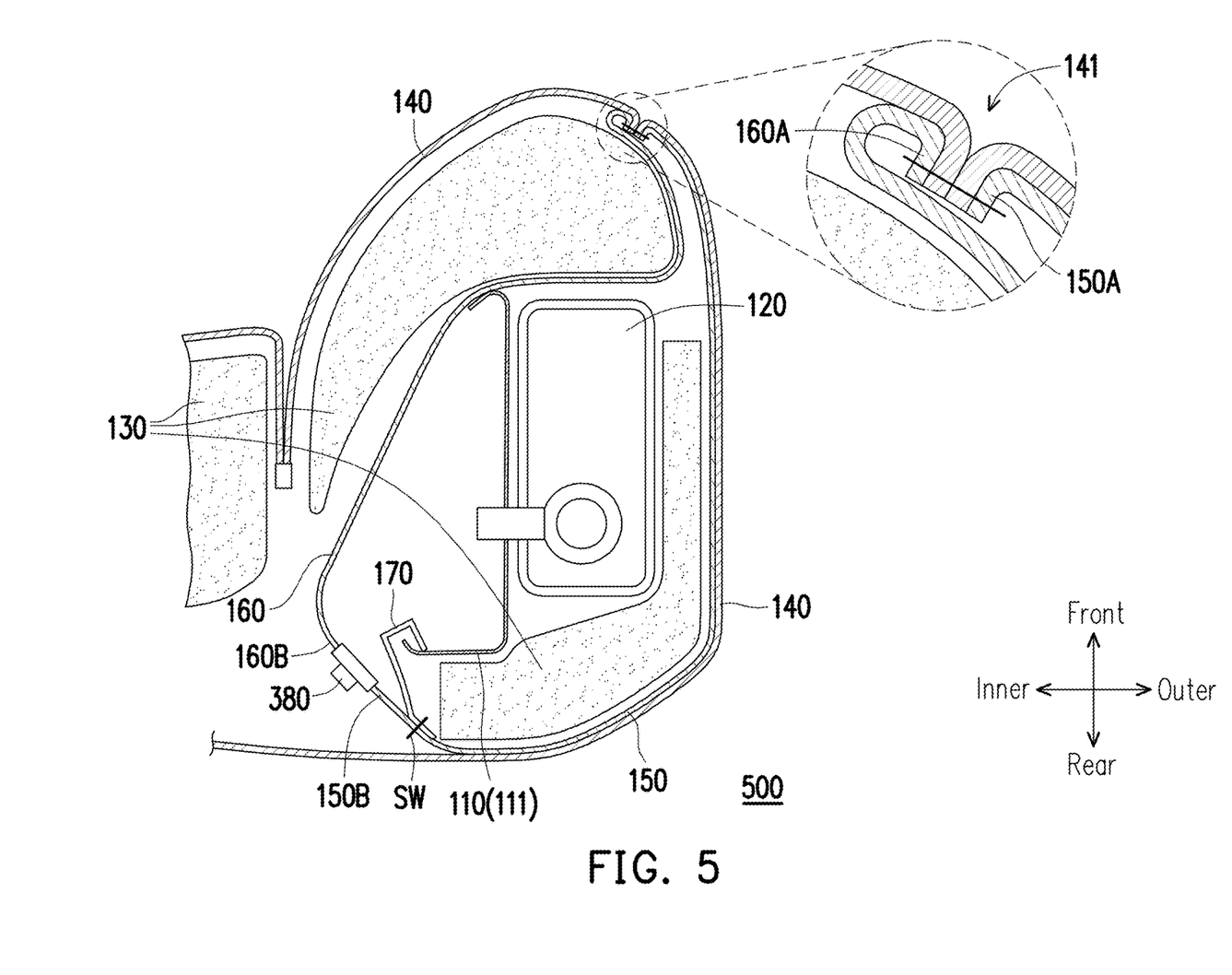
FIG. 5 and FIG. 6 are schematic cross-sectional diagrams of a vehicle seat according to other embodiments of the disclosure near an airbag module.
Figure 6:
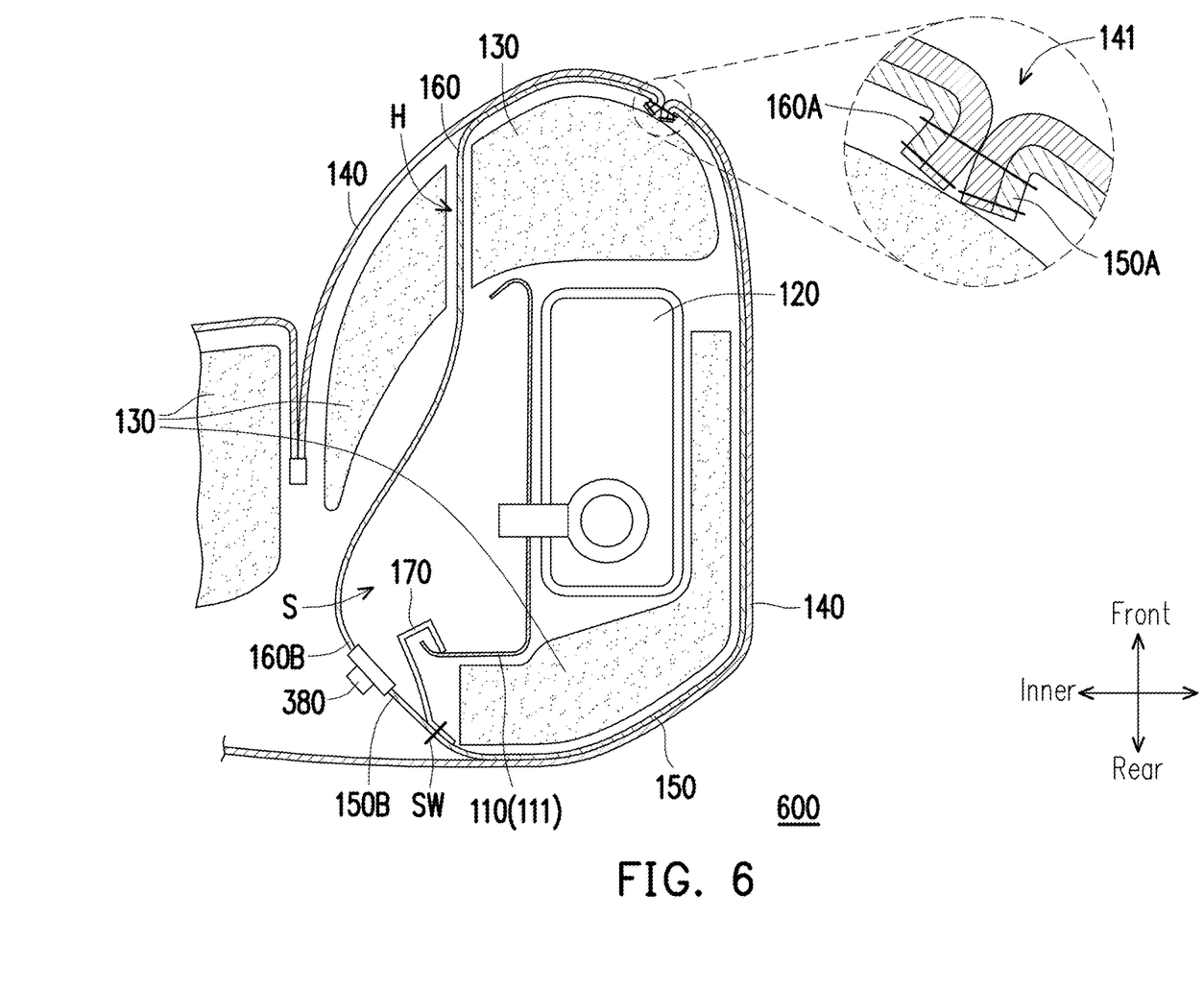

FIG. 5 and FIG. 6 are schematic cross-sectional diagrams of a vehicle seat according to other embodiments of the disclosure near an airbag module. Please refer to FIG. 5 and FIG. 6. In the embodiment, a vehicle seat 500 or 600 is similar to the vehicle seat 300 of FIG. 3A, and the difference between the two is as follows. In the embodiment of FIG. 5, the second lining cloth 160 in the vehicle seat 500 extends along an inner side of the liner 130 and is disposed between the side frame 111 and the liner 130 in the vehicle seat 500. In the embodiment of FIG. 6, a liner 130A of the vehicle seat 600 is provided with a dedicated hole H for the second lining cloth 160 to pass through. As shown in FIG. 6, the second lining cloth 160 in the vehicle seat 600 passes through the dedicated hole H of the liner 130A and is disposed in an idle space S surrounded by the side frame 111 and the liner 130A in the vehicle seat 600.

In the embodiments of FIG. 5 and FIG. 6, since the vehicle seat 500 or 600 has a similar structure to the vehicle seat 300 of FIG. 3A, the vehicle seat 500 or 600 may also limit an expansion direction of an inflatable airbag during a collision through the configurations of the first lining cloth 150 and the second lining cloth 160, and a load of an inflation pressure of the airbag may also be easily concentrated on the tearing portion 141, thereby making it easier for the tearing portion 141 to rupture. Furthermore, in the embodiment, the airbag module 120 may also be assembled onto the side frame 111 first, and through the configuration of the first hook portion 170, the steps of fixing the first lining cloth 150 and the second lining cloth 160 onto the side frame 111 may also be simplified, thereby facilitating the overall assembling process of the vehicle seat 500 or 600. Therefore, the vehicle seat 500 or 600 can also achieve similar effects and advantages as the vehicle seat 300, which will not be described in detail herein.

In summary, in the embodiments of the disclosure, the vehicle seat can limit the expansion direction of the inflatable airbag during the collision through the configurations of the first lining cloth and the second lining cloth, and the load of the inflation pressure of the airbag may be easily concentrated on the tearing portion, thereby making it easier to rupture the tearing portion and enable the airbag to be smoothly expanded toward the front side of the vehicle. Furthermore, in the embodiments of the disclosure, since the airbag module of the vehicle seat may be assembled to the side frame first, and through the configuration of the first hook portion, the steps of fixing the first lining cloth and the second lining cloth onto the side frame may be simplified, thereby facilitating the overall assembling process of the vehicle seat.

Finally, it should be noted that the above embodiments are only configured to illustrate, but not to limit, the technical solutions of the disclosure. Although the disclosure has been described in detail with reference to the above embodiments, persons skilled in the art should understand that the technical solutions described in the above embodiments may still be modified or some or all of the technical features thereof may be equivalently replaced. However, the modifications or replacements do not cause the essence of the corresponding technical solutions to deviate from the scope of the technical solutions of the embodiments of the disclosure.

What is claimed is:

1. A vehicle seat, comprising:
a seat frame, having a side frame;
an airbag module, fixed onto the side frame;
a liner, covering the seat frame;
a covering, covering the seat frame and the liner, the covering being provided with a tearing portion that is ruptured when an airbag is expanded;
a first lining cloth, wherein an outer end of the first lining cloth is connected to the tearing portion;
a second lining cloth, wherein an outer end of the second lining cloth is connected to the tearing portion; and
a first hook portion, disposed at an inner end of one of the first lining cloth and the second lining cloth, and configured to hook and fix one of the first lining cloth and the second lining cloth onto the side frame,
wherein the inner end of the first lining cloth is connected to the inner end of the second lining cloth without connecting the first hook portion between the first lining cloth and the second lining cloth.

2. The vehicle seat according to claim 1, further comprising:
a connecting portion, disposed at the inner end of the first lining cloth and the inner end of the second lining cloth, and configured to connect the inner end of the first lining cloth and the inner end of the second lining cloth.

3. The vehicle seat according to claim 2, wherein:
the connecting portion is a fastener extending along the side frame.

4. The vehicle seat according to claim 2, wherein the connecting portion is a second hook portion, the second hook portion hooks and fixes the inner end of one of the first lining cloth and the second lining cloth onto the inner end of other one of the first lining cloth and the second lining cloth.

5. The vehicle seat according to claim 1, wherein the inner end of the first lining cloth is directly connected to the inner end of the second lining cloth.

6. The vehicle seat according to claim 1, wherein the vehicle seat is installed in a manner such that the first lining cloth and the second lining cloth surround the airbag module and the side frame.

7. The vehicle seat according to claim 2, wherein the vehicle seat is installed in a manner such that the first lining cloth and the second lining cloth surround the airbag module and the side frame.

8. The vehicle seat according to claim 3, wherein the vehicle seat is installed in a manner such that the first lining cloth and the second lining cloth surround the airbag module and the side frame.

9. The vehicle seat according to claim 4, wherein the vehicle seat is installed in a manner such that the first lining cloth and the second lining cloth surround the airbag module and the side frame.

10. The vehicle seat according to claim 5, wherein the vehicle seat is installed in a manner such that the first lining cloth and the second lining cloth surround the airbag module and the side frame.

11. An assembling method of a vehicle seat, wherein the vehicle seat comprises a seat frame having a side frame, an airbag module fixed onto the side frame, a liner covering the seat frame, a covering covering the seat frame and the liner, and a first lining cloth and a second lining cloth, wherein the covering is provided with a tearing portion that is ruptured when an airbag is expanded, and an outer end of the first lining cloth and an outer end of the second lining cloth are both connected to the tearing portion, the assembling method of the vehicle seat comprising:
a fixing step of hooking and fixing a hook portion disposed at an inner end of one of the first lining cloth and the second lining cloth onto the side frame; and
a connecting step of connecting the inner end of the first lining cloth and the inner end of the second lining cloth without connecting the first hook portion between the first lining cloth and the second lining cloth.

12. The assembling method of the vehicle seat according to claim 11, wherein in the connecting step, the inner end of the first lining cloth and the inner end of the second lining cloth are connected through a connecting portion respectively disposed at the inner ends of the first lining cloth and the second lining cloth.

13. The assembling method of the vehicle seat according to claim 11, wherein in the connecting step, the inner end of the first lining cloth is directly connected to the inner end of the second lining cloth.

14. The assembling method of the vehicle seat according to claim 11, wherein before the fixing step, the airbag module is installed to the side frame.

* * * * *